Jan. 28, 1964   P. DANTOWITZ   3,119,308
VELOCITY AND RATE OF CHANGE OF PRESSURE LIMITING SYSTEM
Filed Oct. 19, 1961
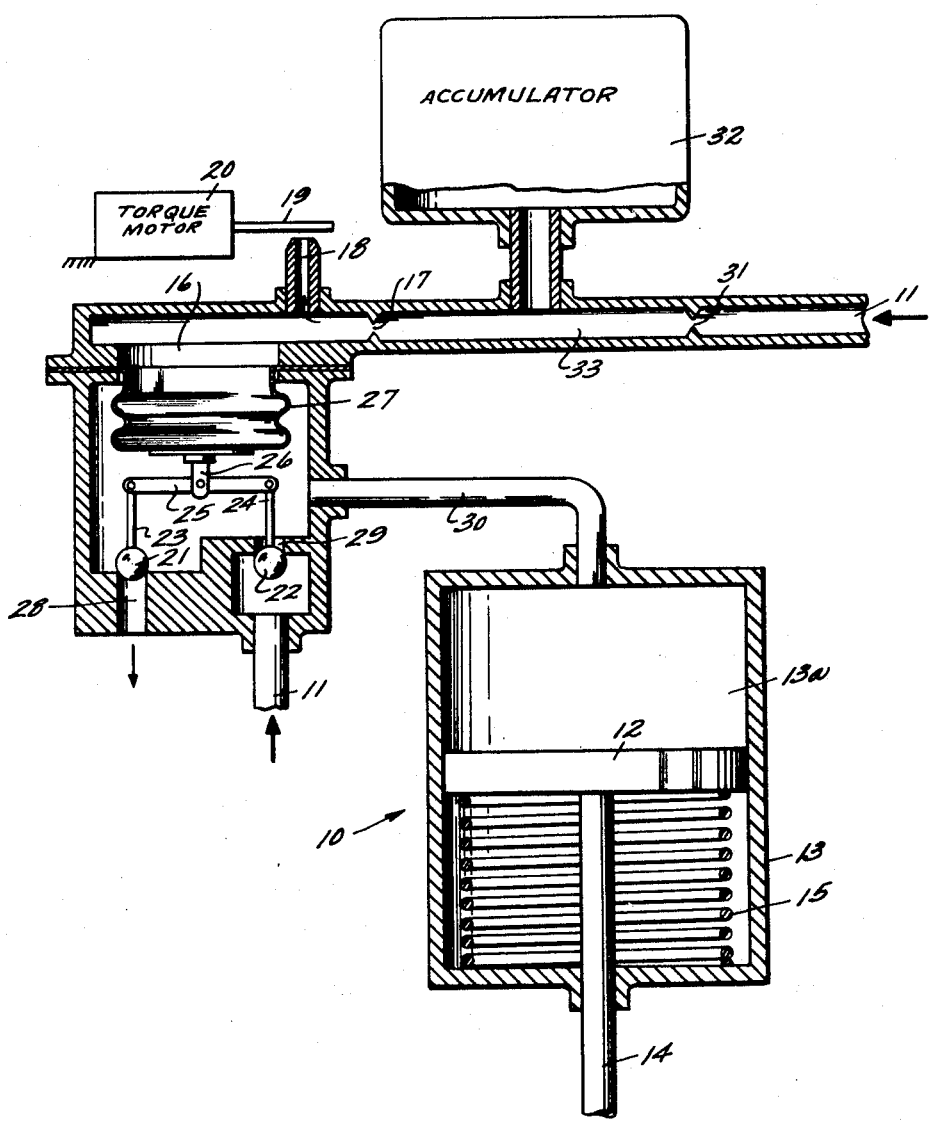
INVENTOR.
PHILIP DANTOWITZ
BY
ATTORNEY

United States Patent Office 3,119,308
Patented Jan. 28, 1964

3,119,308
VELOCITY AND RATE OF CHANGE OF PRESSURE LIMITING SYSTEM
Philip Dantowitz, Peabody, Mass., assignor to General Electric Company, a corporation of New York
Filed Oct. 19, 1961, Ser. No. 146,281
3 Claims. (Cl. 91—38)

My invention relates to gas servomechanism and control systems, and in particular to an arrangement for limiting the velocity and the maximum rate of change of pressure with time of such systems.

In the servomechanisms and control systems field, it is a common practice to utilize controls which are actuated by gases under pressure. In general, such systems, sometimes called gas servo systems, comprise an actuator such as a piston and cylinder or a bellows, a source of gas under pressure, and means for regulating the pressure of the gas delivered to the actuator from the source to control the level of force generated by the actuator.

Such systems may be used for a variety of control purposes, one such being, for example, the position control of a load connected to the actuator. In such a configuration, the position of the load is controlled in response to an input command signal calling for a particular position. An output position signal is then fed back and compared with the input signal, the difference between these two signals then being an error signal which actuates the system to correct the actual output position to that called for by the input command signal.

In such a system the actuator is caused to move by varying the pressure supplied to the actuator. In a double ended system pressure may be applied in opposite directions to either side of a piston-type actuator or to a double bellows system or some other type of actuator to achieve motion in both directions. In a single ended system, a return spring may be used to produce motion in one direction so that motion in both directions may be achieved by upward or downward adjustments of the pressure supplied to a single actuating element.

In certain applications of systems of this kind, I have found it a requirement of the system to limit the rate of change of pressure in the actuator to some preselected maximum level. In one case which I have in mind, this requirement was generated by the necessity for limiting the maximum velocity of the system in one direction to some preselected level. In a spring opposed system, this may be accomplished by limiting the time rate of change of pressure, a point which I will explain in greater detail later on.

In the past, velocity limiting arrangements for such systems have been proposed in the form of flow limiting restrictions or orifices which limit the flow rate of actuating fluid to the actuator. It will be appreciated, however, that where a wide range of load forces must be accommodated, the steady state pressure in the actuator will also vary over a correspondingly wide range.

This means that the leakage flow across the actuator, in the case of the piston or vane type actuator, for example, will also vary over a correspondingly wide range. Thus, a flow limiting orifice sized to limit to a preselected flow rate corresponding to a desired maximum velocity under low pressure conditions will limit the system to a much lower velocity at the high pressure conditions by reason of the increased leakage across the actuator. The result is that the capability of the system to respond at velocities up to the selected maximum limit is compromised at the higher pressure levels. In fact, in one application which I investigated, the actuator leakage flow at the high pressure condition was found to be almost equal to the total flow rate corresponding to the preselected maximum velocity at the low pressure condition. Hence, in this application if the flow to the actuator were limited to the rate corresponding to the desired maximum velocity at the low pressure condition, the actuator would approach a stalled condition at the high pressure level because practically all of the available flow would go into leakage. This effect can be reduced, of course, by providing closer clearances to reduce the leakage, but this adds significantly to the cost of the actuator and introduces problems in operation where clearances will vary by reason of differential thermal expansion, wear and other causes.

It is also desirable in some applications where the maximum velocity of the system for high amplitude excursions is to be limited to some preselected level, to provide a low amplitude or break-away region in which the system can exceed the preselected maximum velocity capability associated with the higher amplitude excursions. This allows the system to take advantage of its higher available capability to overcome static friction and otherwise improve its performance in the low amplitude region where velocity limiting may not be a significant requirement, while at the same time retaining the velocity limiting feature for high amplitude excursions.

It is accordingly an object of my invention to provide a simple and direct means for controlling the time rate of change of pressure in a servo control system of the type which utilizes a compressible gas as its primary operating medium.

It is another object of my invention to provide an improved gas servo actuation system in which the maximum output velocity is limited to some preselected level without compromising the minimum response capabilities of the system at the higher operating pressures.

It is also an object of my invention to provide an improved gas servo system in which means are provided for limiting the maximum velocity of the system for high amplitude excursions while at the same time preserving a higher velocity capability in the low amplitude region.

I accomplish these and other objects of my invention, in one embodiment thereof as applied to a two-stage single ended gas servo actuation system, by the provision of a fixed volume accumulator positioned on the downstream side of the orifice of an orifice/flapper valve combination which forms the first stage of the system. Positioned downstream of the accumulator is a second orifice, the function of which is to preserve the higher velocity capability of the system in the low amplitude region.

For all practical purposes, it can be assumed that the time constant of the second stage is relatively small compared to the dominant time constants of the system, such that the output pressure of the second stage will always correspond to the pressure specified by the magnitude of the first stage output pressure. Assume then that the flapper moves to a position which would normally produce an immediate increase in the first stage output pressure to the maximum level. In the typical system, this would normally result in an output velocity corresponding to the maximum capability of the system. In the embodiment of my invention which I am describing, however, the rate at which the output pressure of the first stage can build up is limited by the flow orifice upstream of the accumulator, which determines the charging rate of the accumulator. Assuming that the process of charging the accumulator is an isothermal one, the time rate of change of accumulator pressure will be essentially constant, dependent on the supply pressure and temperature and to a minor extent on the pressure downstream of the flow limiting orifice. Thus the time rate of change of the first stage output pressure and the second stage output pressure will both be held substantially constant and the maximum output velocity of the actuator will be correspondingly limited. The system will also be virtually insensitive to changing loads on the actuator because the rate of change of pressure is determined primarily by the pressure and temperature of the supply and is substantially insensitive to actuator leakage flow.

Other objects and advantages of my invention will become apparent from the following description taken in connection with the accompanying drawing, in which the single figure is a schematic presentation of a gas servo system embodying my invention.

Referring to the drawing, I show a gas servo system in which an actuator 10 is to be controlled from a source of gas 11 under pressure. The actuator 10 is a single ended system comprising a piston 12 slidably mounted in a cylinder 13 and having an output shaft 14 connectible to the load which is to be controlled. Movement of the piston in the downward direction is achieved by increasing pressure in the upper cylinder space 13a, while movement in the opposite direction is obtained by decreasing the pressure in the space 13a and allowing the piston to move upward under the force of a spring 15.

The system shown is a two-stage arrangement, the first stage output being represented by the magnitude of the pressure in the control volume 16. The first stage includes a pair of orifices 17 and 31, a nozzle 18, a flapper valve 19, a torque motor 20, and a fixed volume accumulator 32. The input to the first stage is in the form of an electrical signal applied to the torque motor 20 which in turn determines the position of the flapper 19 to control the pressure in the control volume 16 in a manner which will be hereinafter explained.

The second stage responds to the magnitude of the pressure in the control volume 16 to control gas flow into and out of the actuator 10 by means of a pressure actuated valving system comprising a pair of spherically shaped valve elements 21 and 22. Valve elements 21 and 22 are secured respectively to control rods 23 and 24 which are, in turn, pivotally mounted near the opposite ends of a crossarm 25. The crossarm 25 is pivotally mounted on a supporting element 26 which is, in turn, secured to a bellows 27.

The valve 21 is positioned to open and close the vent passage 28 which discharges to atmosphere or to a low pressure sink. The valve element 22 is positioned to control the flow of gas from the supply 11 through passages 29 and 30 to the upper portion 13a of the cylinder 13. The position of the actuator piston 12 in the cylinder 13 is thus controlled by the magnitude of the pressure in the upper portion 13a of the cylinder. The pressure in the control volume 16 which in turn determines the magnitude of the pressure in the actuator is controlled by the first stage in response to a command signal applied to the torque motor 20. The operation of the system will now be described.

Assume for purposes of explanation that a pressure drop across the orifice 31 is greater than critical such that the gas flow rate through the orifice is independent of downstream conditions. In other words, with greater than critical pressure ratio across the orifice 31, the flow rate of gas through the orifice is determined by the gas conditions upstream of the orifice. The pressure ratio is the pressure upstream of the orifice divided by the pressure downstream of the orifice. The area of the second orifice 17 is selected sufficiently larger than the area of the orifice 31 such that the pressure drop across the oriffice 17 produces a pressure ratio which is less than the critical level. Connected into the system at a point in the gas supply path intermediate the two orifices 17 and 31 is a fixed volume accumulator, the function of which will be described later on. Now for the condition just described, that is with greater than critical pressure ratio across the orifice 31, and neglecting for the moment the effects of the accumulator 32, it will be observed that for a constant flow through the nozzle 18, the pressure drop across the nozzle will vary inversely with its effective area, which is in turn determined by the position of the flapper 19 relative to the nozzle 18. In other words, as the flapper moves closer to the nozzle 18, the effective area of the nozzle is reduced, thereby increasing the pressure drop across it and increasing the pressure level in the control volume 16. That is, as the pressure drop across the nozzle 18 increases above a fixed ambient discharge pressure, the pressure in the control volume 16 will be correspondingly increased. Conversely, as the flapper 19 is moved away from the nozzle 18 the effective area of the nozzle is increased, reducing the pressure drop across the nozzle and decreasing the pressure level in the control volume 16. Because of the existence of a greater than critical pressure ratio across the orifice 31, the effect of the second orifice 17 in the foregoing sequence is negligible.

Now the function of the particular embodiment of my invention shown in the drawing is to limit the time rate of increase of pressure in the control volume 16 such that for the arrangement illustrated the maximum downward velocity of the actuator piston 12 is limited to some preselected level below the maximum capability of the system. In this particular system, it is desired that the system respond at its full velocity capability in the upward or return stroke direction. It is also desired to preserve a higher velocity capability for low amplitude excursions to allow the system better to overcome breakaway forces and to permit better performance in the low amplitude region. The manner in which the system operates to satisfy these requirements will now be described.

Assume for purposes of explanation either a failure in the system or a maximum signal applied to the torque motor 20 in a direction such that the flapper valve 19 moves to its fully closed position against the nozzle 18. In a conventional system, such an occurrence would normally produce substantially full supply pressure almost instantaneously in the control volume 16, the time to reach full pressure being limited only by the charging time of the control volume 16.

In the arrangement shown, however, the pressure in the control volume 16 can increase at this rapid rate only until the pressure in the control volume 16 reaches the level of the pressure in the passage 33 upstream of the orifice 17. Once this point is reached, the time rate of increase of pressure in the control volume 16 is limited by the rate at which the pressure can increase in the passage 33, which is in turn controlled by the rate at which the accumulator 32 can charge through the orifice 31.

The process of pressurizing the accumulator 32 will be nearly an isothermal one and hence the time rate of change of pressure in the accumulator will be directly proportional to the rate flow of gas passing through the orifice 31. This weight flow is dependent primarily on the pressure and temperature of the gas upstream of the orifice 31 and to a minor extent on the pressure downstream of the orifice 31. For any given range of conditions the maximum weight flow and hence the maximum time rate of change of pressure in the accumulator can be determined. The volume of the accumulator 32 and the area of the orifice 31 are chosen to produce a preselected maximum time rate of change of pressure which will then also be, for the reasons already explained, the limiting time rate of change of pressure in the control volume 16 once that pressure has reached the level of the pressure in the passage 33 upstream of the orifice 17.

Now, limiting the maximum time rate of change of pressure in the control volume 16 will also impose a corresponding limit on the velocity of the actuator piston 12. This may be explained as follows:

It will be observed that as the pressure in the control volume 16 begins to increase, a pressure differential is created across the bellows 27 tending to move the bellows in a downward direction. Downward movement of the bellows causes the valve linkage arrangement to pivot about the valve 21 and move the valve 22 downward to open the supply port 29. The opening of the supply port 29 admits gas from the supply 11 to the actuator through the conduit 30 and the pressure in the actuator begins to increase.

As the actuator pressure begins to increase in a direction to restore the pressure balance across the bellows 27, the valve 22 will move back toward the closed position. Because the time constant of the bellows and its associated linkage is quite small compared to the dominant time constants of the system, its response will be relatively rapid and the actuator pressure will thus track or follow very closely the pressure in control volume 16. To explain this more fully, a small incremental increase in the pressure in control volume 16 will produce an equal incremental increase in the actuator pressure to restore the pressure balance across the bellows and move the valve 22 back to its closed position and this process can be said to occur almost instantaneously in comparison to the overall time response rate of the system.

Thus, the time rate of change of pressure in the actuator will correspond almost exactly to the time rate of change of pressure in the control volume 16 which is, in turn, limited to the preselected maximum rate determined by the charging rate of the accumulator 32. For the actuator itself, the force exerted on the piston by the gas in the cylinder 13a will be equal to the gas pressure multiplied by the area of the piston 12. In other words, (1) $$F = AP$$

where F is the downward force exerted by the piston, P is the pressure differential across the piston, and A is the piston area. Differentiating both sides of this equation with respect to time produces the following relationship:

(2) $$\frac{dF}{dt} = A\frac{dP}{dt}$$

where $$\frac{dF}{dt}$$

is the time rate of change of the piston force F and $$\frac{dP}{dt}$$

is the time rate of change of pressure P. Assuming a linear spring characteristic the upward force exerted by the spring 15 is (3) $$F_s = KX$$

where $F_s$ is the spring force, K is the spring constant and $x$ is the displacement from the zero force position. This expression can also be differentiated to produce (4) $$\frac{dF_s}{dt} = K\frac{dx}{dt} = KV$$

Where V is the actuator velocity, $$\frac{dx}{dt}$$

Assuming that the acceleration rate of the actuator will be negligibly small, then the rate of change of pressure force on the upper side of the piston 12 must be equal to the rate of change of the spring force exerted on the piston in the opposite direction. Equating $$\frac{dF_s}{dt}$$

to the expression for $$\frac{dF}{dt}$$

the following expression is derived:

(5) $$\frac{dF_s}{dt} = A\frac{dP}{dt} = KV$$

This, in turn, yields the expression:

(6) $$V = \frac{A}{K}\frac{dP}{dt}$$

Thus, it will be observed that the downward velocity of the piston 12 is determined by the time rate of change of actuator pressure. As has been explained above, the time rate of increase of actuator pressure is limited to the preselected maximum value determined by the charging rate of accumulator 32. Correspondingly, then, the maximum velocity of the actuator on its downward stroke is limited to the magnitude determined by Equation 6 above.

Now, it is normally desirable in control systems of the kind here under discussion to require the actuator to execute its return or retracting stroke at a velocity which represents the maximum capability of the system. It would, therefore, be expected that shortly after a failure or other event which produces a sequence of the kind just described, the system will receive a command signal calling for the actuator to return as rapidly as possible to its maximum upward or fully retracted position. Under these conditions the flapper valve 19 will be caused to move to its maximum position away from the nozzle 18 essentially venting the control volume 16 and causing the pressure in the control volume to decay very rapidly. In this condition the accumulator 32 will have little effect on the decay rate of the pressure in the control volume 16 because of the areas of the orifice 17 and the nozzle 18 can be selected in relation to the volume of the control volume 16 to achieve a very rapid decay rate.

As the pressure in the control volume 16 begins to decay, a pressure unbalance is created across the bellows by reason of the higher pressure in the actuator, which will move the bellows in an upward direction to open the valve 21 and vent the actuator to ambient or a low pressure sink through the passage 28. Here again assuming a rapid response of the bellows and its associated linkage in an adequate venting area, the actuator pressure will track the pressure in control volume 16 very closely and will decay at approximately the same rate. Thus the return stroke will be accomplished at the maximum capability rate of the system without being affected by the velocity limit imposed in the opposite or downward direction.

It is also desirable, for reasons which I have already explored, to preserve a high velocity capability of the system in the low amplitude region, while at the same time maintaining the velocity limit for high amplitude excursions. This is accomplished by the orifice 17. It will be observed that the rate at which the pressure in the control volume 16 can increase is not limited by the accumulator charging rate until the pressure in the control volume reaches the level of the pressure in the passage 33 upstream of the orifice 17. Once this level is reached, however, further attempts to increase the pressure in the control volume 16 will be limited by the charging rate of the accumulator 32. The width of the low amplitude high velocity response region is determined by the magnitude of the pressure drop across the orifice 17. In other words, for a very small pressure drop across the orifice 17, the available pressure change which can be made before reaching the level of the pressure upstream of the orifice 17 will be correspondingly very small. Similarly a higher pressure drop across the orifice 17 will provide a wider high performance region because the system can traverse a wider pressure increment at the high velocity capability before reaching the level at which the limit of the accumulator charging rate is imposed on the system. The orifice 17 can thus be sized to provide the desired width of the high performance region.

It will be observed that my invention overcomes the primary disadvantages associated with the conventional flow limiting orifice technique of limiting the maximum velocity of an actuator. Such a system might take the form, for example, of a flow limiting orifice placed in the conduit 30 connected to the actuator. As I have pointed out above, for a system which must accommodate a wide range of loads on the actuator and in which the pressure in the actuator must vary over a correspondingly wide range, the flow limiting orifice technique of achieving velocity limit results in a compromise of the ability of the system to perform at the higher pressure, higher load conditions because a greater portion of the flow under these conditions is absorbed by leakage across the actuator. In addition, the flow limiting orifice technique imposes a flat limit on the system across its entire operating range and does not permit the provision of a low amplitude high performance region in which the velocity limit may be exceeded.

It wil be observed that my invention is not limited to the particular details of the flapper valve arrangement nor the bellows actuated valve system of the second stage, both of which are chosen merely for purposes of illustrating a particular embodiment of my invention. A wide variety of such elements is well known to those skilled in the art and it should be apparent that my invention will find applications in other types of two-stage gas servo systems. By a two-stage system, I mean a system in which the first stage establishes a control pressure level and the second stage responds to this control pressure level to do the actual work of controlling the pressure level in an actuator.

It will also be apparent that my invention can be used for other than velocity limiting purposes, in that it provides a means for limiting the maximum time rate of change of pressure in a two-stage gas servo valve system. In the particular embodiment which I have presented herein, the limitation imposed on time rate of change of pressure is utilized to achieve a velocity limit, but it will nevertheless be apparent that the generation of a maximum time rate of change of pressure characteristic may have application in other types of two-stage gas servo systems.

In light of the foregoing, it will be apparent that various changes, modifications and substitutions may be made in the embodiment of my invention which I have presented herein without departing from the true scope and spirit of my invention as I have defined it in the appended claims.

What I claim as new and desire to secure by Letters Patent of the United States is:

1. A gas servo system comprising pressure modulating means, a gas flow path for supplying gas under pressure to said pressure modulating means, said pressure modulating means including first flow restrictive means positioned in said gas flow path and a discharge nozzle of variable effective area in said gas flow path downstream of said first flow restrictive means, an accumulator connected to said gas flow path at a point downstream of said first flow restrictive means and upstream of said discharge nozzle to limit the maximum time rate of change of pressure achievable by said pressure modulating means over at least a portion of the operating range of said system, and second flow restrictive means positioned in said gas flow path downstream of said accumulator and upstream of said discharge nozzle.

2. A gas servo system comprising a gas flow path connectible to a source of gas under pressure, first stage pressure modulating means operable to establish an output control pressure in response to an input signal, said first stage pressure modulating means comprising first flow restrictive means in said gas flow path and a discharge nozzle of variable effective area in said gas flow path downstream of said first flow restrictive means, an accumulator connected to said gas flow path at a point downstream of said first flow restrictive means and upstream of said discharge nozzle, second flow restrictive means in said gas flow path downstream of said accumulator and upstream of said discharge nozzle, an actuator, means resiliently urging said actuator in a first direction, and second stage valve means responsive to the control pressure established by said first stage pressure modulating means to control the pressure level in said actuator to develop an actuating force in a direction opposite to said first direction.

3. A gas servo system comprising a gas flow path connectible to a source of gas under pressure, first stage pressure modulating means operable to establish an output control pressure in response to an input signal, said first stage pressure modulating means comprising first flow restrictive means in said gas flow path and a discharge nozzle of variable effective area in said gas flow path downstream of said first flow restrictive means, an accumulator connected to said gas flow path at a point downstream of said first flow restrictive means and upstream of said discharge nozzle, second flow restrictive means in said gas flow path downstream of said accumulator and upstream of said discharge nozzle, an actuator, and second stage valve means responsive to said control pressure established by said first stage pressure modulating means to control the pressure level in said actuator.

References Cited in the file of this patent

UNITED STATES PATENTS

| | | |
|---|---|---|
| 2,521,477 | Pellettere | Sept. 5, 1950 |
| 2,834,363 | Pessen | May 13, 1958 |
| 2,878,825 | Grogan et al. | Mar. 24, 1959 |
| 2,993,497 | Coles et al. | July 25, 1961 |
| 3,048,770 | Nye et al. | Aug. 7, 1962 |
| 3,084,450 | Bowditch | Apr. 9, 1963 |